(12) United States Patent
Yoon

(10) Patent No.: US 9,185,781 B2
(45) Date of Patent: Nov. 10, 2015

(54) LIGHTING APPARATUS HAVING COMPLEX SENSOR AND INTERWORKING TYPE LIGHTING SYSTEM

(71) Applicant: Youngchul Yoon, Uijeongbu-si (KR)

(72) Inventor: Youngchul Yoon, Uijeongbu-si (KR)

( * ) Notice: Subject to any disclaimer, the term of this patent is extended or adjusted under 35 U.S.C. 154(b) by 0 days.

(21) Appl. No.: 14/419,654

(22) PCT Filed: Feb. 5, 2013

(86) PCT No.: PCT/KR2013/000903
§ 371 (c)(1),
(2) Date: Feb. 5, 2015

(87) PCT Pub. No.: WO2014/027729
PCT Pub. Date: Feb. 20, 2014

(65) Prior Publication Data
US 2015/0208486 A1    Jul. 23, 2015

(30) Foreign Application Priority Data
Aug. 15, 2012  (KR) .................. 10-2012-0089205

(51) Int. Cl.
*H05B 37/02* (2006.01)
*H05B 33/08* (2006.01)

(52) U.S. Cl.
CPC ........ *H05B 37/0227* (2013.01); *H05B 33/0845* (2013.01); *H05B 37/0281* (2013.01); *Y02B 20/72* (2013.01)

(58) Field of Classification Search
CPC ........... H05B 37/0218; H05B 37/0227; H05B 33/0845; H05B 33/0854; Y02B 20/72
USPC .................. 315/149, 150, 156–159, 224, 246
See application file for complete search history.

(56) References Cited

U.S. PATENT DOCUMENTS 8,866,392 B2 * 10/2014 Chen .................... G08B 15/00
                                                    315/152
8,981,671 B2 *  3/2015 Karasawa .......... H05B 37/0272
                                                    315/297

(Continued)

FOREIGN PATENT DOCUMENTS

JP      10-153656 A      6/1998
KR     10-0928455 B1    11/2009

(Continued)

OTHER PUBLICATIONS

International Search Report for PCT/KR2013/000903 mailed Apr. 5, 2013 from Korean Intellectual Property Office.

*Primary Examiner* — Minh D A
*Assistant Examiner* — Borna Alaeddini
(74) *Attorney, Agent, or Firm* — Revolution IP, PLLC

(57) ABSTRACT

Disclosed is a lighting apparatus having a complex sensor. The apparatus includes a short distance motion sensor to sense an object at a short distance, a long distance motion sensor to sense an object at a long distance, a signal amplifier to amplify signals from the sensors, a lamp to be adjustable in brightness in multiple stages, a timer to count a dark adaptation time, and a controller. The controller controls the lamp to a first brightness upon receiving a signal from the long distance motion sensor and to a second brightness higher than the first brightness upon receiving a signal from the short distance motion sensor and controls the timer to count the dark adaptation time at the second brightness, thereby reducing the brightness of the lamp by an illuminance within a dark adaptation threshold value set in the controller whenever the timer generates a counting signal.

5 Claims, 6 Drawing Sheets

(56) References Cited

U.S. PATENT DOCUMENTS

| | | | |
|---|---|---|---|
| 2010/0001652 A1* | 1/2010 | Damsleth | H05B 37/0227 315/149 |
| 2010/0201267 A1* | 8/2010 | Bourquin | H05B 37/0245 315/32 |
| 2012/0049746 A1 | 3/2012 | Yoon | |
| 2012/0062123 A1* | 3/2012 | Jarrell | H05B 37/0245 315/131 |
| 2013/0320865 A1* | 12/2013 | Murakami | H05B 37/0227 315/158 |
| 2014/0001961 A1* | 1/2014 | Anderson | H05B 37/0227 315/153 |

FOREIGN PATENT DOCUMENTS

| | | |
|---|---|---|
| KR | 10-0982356 B1 | 9/2010 |
| KR | 10-0986273 B1 | 10/2010 |

\* cited by examiner (a)

(b)

LIGHTING APPARATUS HAVING COMPLEX SENSOR AND INTERWORKING TYPE LIGHTING SYSTEM

CROSS REFERENCE TO PRIOR APPLICATIONS

This application is a National Stage Application of PCT International Patent Application No. PCT/KR2013/000903 filed on Feb. 5, 2013, under 35 U.S.C. §371, which claims priority to Korean Patent Application No. 10-2012-0089205 filed on Aug. 15, 2012, which are all hereby incorporated by reference in their entirety.

BACKGROUND OF THE INVENTION

1. Field of the Invention

The present invention relates to lighting apparatuses for use in indoor or outdoor installation places, which are adapted to be installed in wide spaces, such as offices or basement garages, or in elongated spaces, such as corridors or tunnels, or adapted to be used as streetlights or security lamps. More particularly, the present invention relates to lighting apparatuses, which provide preset minimum illumination upon sensing no object in order to relieve anxiety that people may feel when passing through a dark and long space, which provide efficiently bright illumination upon sensing an object through use of a complex sensor by efficiently controlling the brightness of a lamp based on movement of the object, and which provide illumination in consideration of physiological reactions of humans with respect to the brightness of a lamp, thereby achieving an additional advantage of reduction in energy consumption.

2. Description of the Related Art

Current lighting apparatuses are configured to sense motion of people at night so that lighting apparatuses present at positions where motion of people is sensed are turned on and then turned off when people move out of a sensing range thereof.

A conventional lighting apparatus is comprised of a sensor unit consisting of a plurality of motion sensors each having a characteristic code, a single processor to process a signal from the sensor unit, a controller to control a lamp unit in response to the signal from the signal processor, and the lamp unit to drive a lamp located at any position in response to a control signal from the controller. With regard to the lighting apparatus installed in any area, through use of the motion sensors to sense whether a person who requires illumination is present, the corresponding lighting apparatus is turned on upon sensing the presence of the person and then turned off when the person moves out of the corresponding area. Then, another lighting apparatus, which is installed in an area where the person is newly sensed, is turned on.

In use of the conventional lighting apparatus as described above, in the case in which a person moves out of a particular sensing area, but is not immediately sensed in a new sensing area, all lighting apparatuses temporarily become a power-off state, which may cause the person who passes through an elongated space to feel anxiety. In addition, note that the sensors of the lighting apparatus do not immediately sense an object, such as a person, car, or the like, when the object initially enters a particular space. Thus, the person who suddenly enters a dark space is liable to feel anxiety. In addition, since a lighting apparatus, installed in an area where a person is sensed, is turned on, but other lighting apparatuses installed in other areas are in a power-off state and, thus, only a particular area is illuminated and the other areas are in a dark state, a person who passes through a wide and long space cannot know whether any dangerous object is present in a dark area and thus may feel anxiety and be exposed to danger of accidents.

There is also proposed a method for installing a plurality of lighting apparatuses, rather than a single product, so that the lighting apparatuses interwork with one another in a wired or wireless manner. However, executing interworking of the lighting apparatuses in a wired manner requires installation of cables, causing inconvenient construction and high construction costs. On the other hand, executing interworking of the lighting apparatuses in a wireless manner is likely to cause communication errors under the influence of a surrounding environment and requires a complicated configuration including a communication unit, and the like.

SUMMARY OF THE INVENTION

The present invention is devised to solve the above-described problems and an object of the present invention is to provide a lighting apparatus having a complex sensor, which is capable of providing effective interworking of lamps based on movement of a person, without adopting wired/wireless communication, through use of a complex sensor that consists of a short distance motion sensor and a long distance motion sensor, and also capable of considerably reducing energy consumption while preventing a person from recognizing variation in illuminance, and a lighting system using the same.

In accordance with an aspect of the present invention, to accomplish the above and other objects, a lighting apparatus having a complex sensor includes a short distance motion sensor configured to sense an object located at a short distance, a long distance motion sensor configured to sense an object located at a long distance, a signal amplifier configured to amplify sensing signals received from the sensors, a lamp configured to be adjustable in brightness in multiple preset stages, a timer configured to count a dark adaptation time, and a controller storing a preset dark adaptation threshold value and configured to control the respective components, wherein the controller controls the lamp to first a brightness upon receiving a sensing signal from the long distance motion sensor, controls the lamp to a second brightness higher than the first brightness upon receiving a sensing signal from the short distance motion sensor, and controls the timer to count the dark adaptation time at the second brightness, thereby controlling the lamp to be reduced in brightness by an illuminance within the preset dark adaptation threshold value whenever the timer generates a counting signal while preventing a person from perceiving variation in illuminance.

In accordance with another aspect of the present invention, a lighting apparatus having a complex sensor includes a short distance motion sensor configured to sense an object located at a short distance, a long distance motion sensor configured to sense an object located at a long distance, a signal amplifier configured to amplify sensing signals received from the sensors, a lamp configured to be adjustable in brightness in multiple preset stages, and a controller configured to control the lamp to a first brightness upon receiving a sensing signal from the long distance motion sensor and to control the lamp to a second brightness higher than the first brightness upon receiving a sensing signal from the short distance motion sensor.

In accordance with a further aspect of the present invention, a lighting system includes at least two lighting apparatuses each having a complex sensor, wherein, while a short distance motion sensor of one lighting apparatus having a first complex sensor senses an object to cause a lamp to emit light at a second brightness, a long distance motion sensor of another lighting apparatus having a second complex sensor in proximity to the lighting apparatus having the first complex sensor senses the object to cause a lamp to emit light at a first brightness.

According to the present invention, through the use of a complex sensor consisting of a short distance motion sensor and a long distance motion sensor, a lamp is controlled to emit light at a first brightness when an object is sensed by the long distance motion sensor and also controlled to emit light at a second brightness that is greater than the first brightness when an object is sensed by the short distance motion sensor. In this way, lamp interworking control based on movement of a person may be accomplished without adopting wired/wireless communication, which provides the effects of relieving anxiety that people may feel when passing through a dark and long space and of preventing occurrence of accidents.

In addition, the brightness of the lamp may be reduced from the first brightness or the second brightness by a given degree to prevent a person who is under the lamp from recognizing variation in illuminance, which has the effect of achieving reduction in energy consumption while preventing the person from being inconvenienced due to sudden illuminance variation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the embodiments of the present invention will be described in detail with reference to the accompanying drawings.

Figure 1:
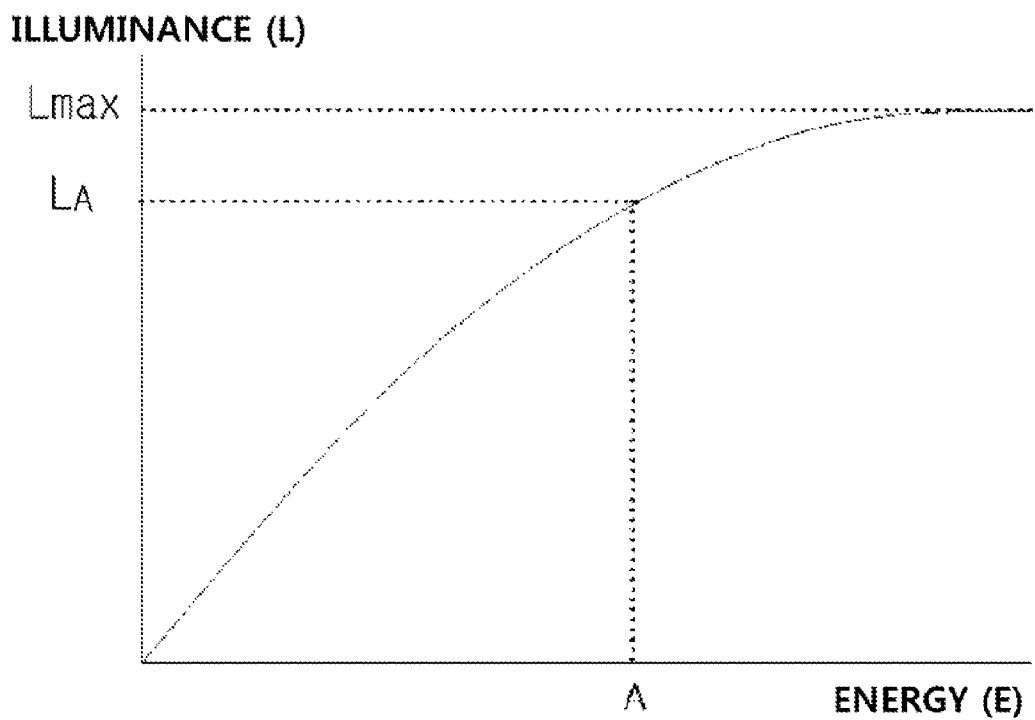
FIG. 1 is a graphic view illustrating the relationship between illuminance and energy according to the present invention.

FIG. 1 is a graphic view illustrating the relationship between illuminance and energy. As can be seen from FIG. 1, illuminance rapidly increases in proportion to rapid increase in energy consumption, but above a certain level of illuminance $L_4$, illuminance gently increases as compared to increase in energy consumption.

That is, energy consumption is great, but illuminance does not considerably increase in proportion to the energy consumption, above the certain level of illuminance. Therefore, it is desirable to slightly lower illuminance below the maximum illuminance within a range imperceptible to people, in consideration of energy efficiency.

Figure 2:
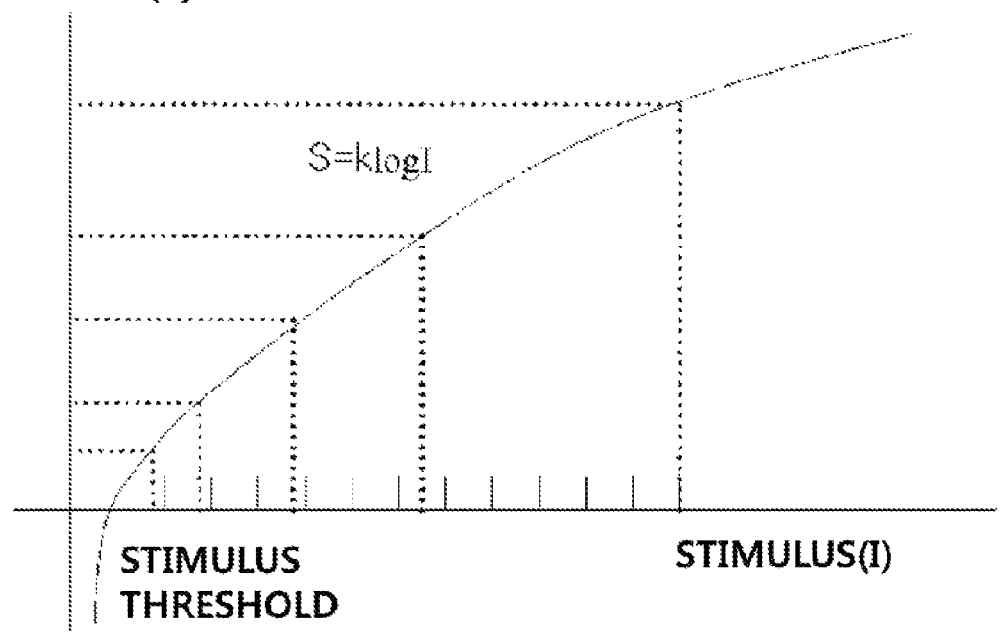
FIG. 2 is a graphic view showing the relationship between stimulus and sensation.

FIG. 2 is a graphic view showing the relationship between stimulus and sensation. As exemplarily shown in FIG. 2, the human body constantly responds to external stimuli. There are individual sensory organs that are sensitive to external stimuli according to the kinds of external stimuli having an effect on the human body. However, indefinitely precise perception of a sensation is impossible and all sensations have minimum stimulation values for response. This minimum stimulation value is called a threshold value in biology. In brief, a person cannot completely perceive a stimulus applied to a corresponding sensory organ when the stimulus is below a threshold value.

A sensation, which is intended to be employed in the present invention in relation to illuminance, is vision. A sensory organ, a suitable stimulus of which is vision, is an eye. When illuminance varies, the sensory organ undergoes variation in order to acclimatize to the varied illuminance. When illuminance is lowered, the iris of the eye increases the size of the pupil, and sensitivity of retinal visual cells is adjusted. In other words, a threshold value of the visual cells is adjusted. The sensitivity of the visual cells is adjusted by a material called rhodopsin. Rhodopsin is a material that is decomposed by light to generate energy, which allows a person to perceive vision.

When illuminance is lowered, rod-shaped cells among the visual cells synthesize and accumulate rhodopsin in proportion to reduction in illuminance, and the human eye acclimatizes to darkness when a sufficient amount of rhodopsin is synthesized. A phenomenon that the eye acclimatizes to darkness is called dark adaptation, whereas a phenomenon that the eye acclimatizes to a bright situation is called light adaptation. Even if the visual cells have perceived variation in illuminance to some extent under the condition of appropriate variation in illuminance, when a mechanism as described above operates within a short time to allow vision to adapt to varied illuminance, the human body can adapt to variation in illuminance without substantial perception of a sensation (e.g., without feeling uneasy) with regard to the sensitivity of cells.

Based on the Weber-Fechner law regarding the relationship between the intensity of a physical stimulus and the magnitude of a sensation that people feel, the magnitude of a subjective sensation is proportional to the logarithm of the intensity of a physical stimulus that arouses the sensation. That is, the greater intensity of a stimulus causes a sensation to become dull. The intensity of a stimulus at which a human body begins to respond is proportional to an initial stimulus and a response degree becomes weak as the intensity of a stimulus is increased. In other words, the higher illuminance corresponds to a greater threshold value and the lower illuminance corresponds to a smaller threshold value, and the lower illuminance requires a greater time for adaptation and the higher illuminance requires a shorter time for adaptation. Based on this principle, it is predictable that a response degree will be weak in a bright state and, therefore, greater variation in illuminance is possible and vice versa in a dark state.

Figure 3:
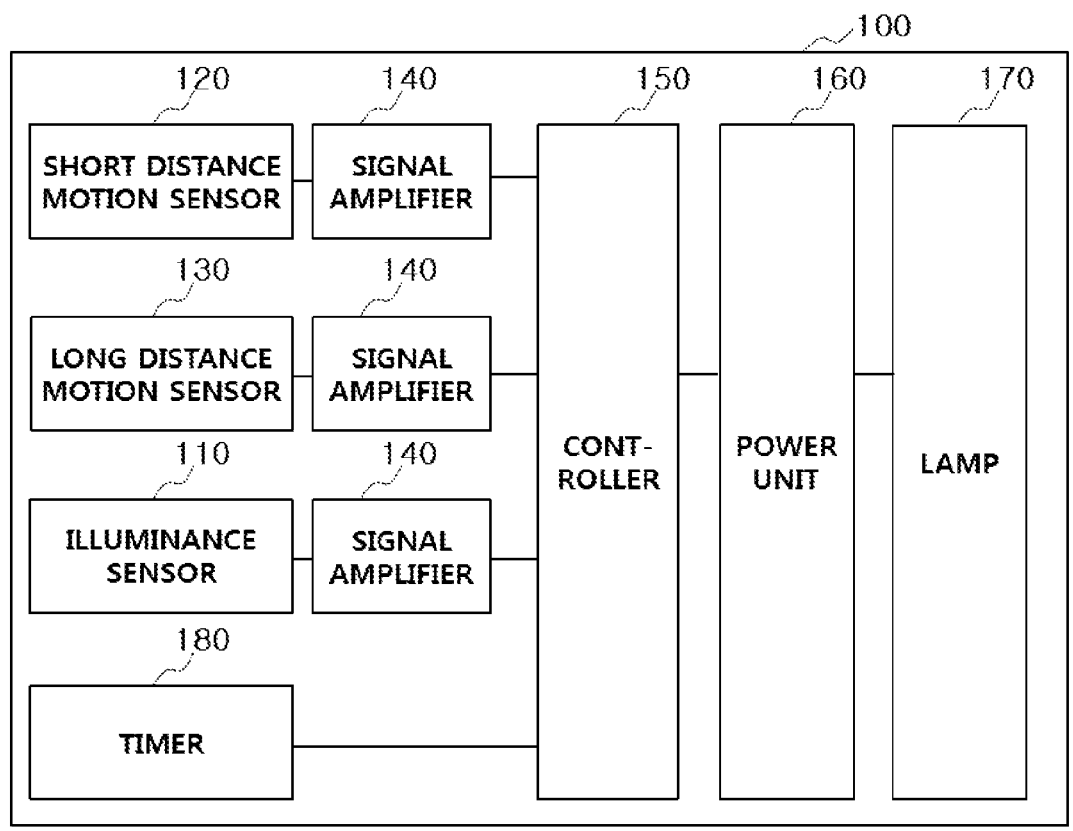
FIG. 3 is a view showing one embodiment of an interior configuration of a lighting apparatus having a complex sensor according to the present invention.

FIG. 3 is a view showing an interior configuration of a lighting apparatus having a complex sensor according to the present invention.

The lighting apparatus having a complex sensor according to the present invention, as exemplarily shown in FIG. 3, includes a short distance motion sensor 120 to sense motion of an object located at a short distance, a long distance motion sensor 130 to sense motion of an object located at a long distance, an illuminance sensor 110 to sense an external illuminance, a signal amplifier 140 to amplify sensing signals received from the sensors 120 and 130, a lamp 170, the brightness of which is adjustable in multiple preset stages, a timer 180 to count a dark adaptation time, a power unit 160 to supply power required for illumination, and a controller 150 to control the brightness of the lamp 170 using the sensing signals transmitted from the sensors, a dark adaptation threshold value being set in the controller 150.

The short distance motion sensor 120 functions to sense motion of an object located at a short distance and to transmit a sensing signal to the controller 150 upon sensing of the object.

The long distance motion sensor 130 functions to sense motion of an object located at a long distance and to transmit a sensing signal to the controller 150 upon sensing of the object.

The short distance motion sensor 120 and the long distance motion sensor 130 differ in terms of an object sensing distance, and this sensing distance difference may be set in various ways in consideration of, for example, users who intend to use the present invention and functions of these sensors.

The long distance motion sensor 130 and the short distance motion sensor 120 as described above are configured to sense not only a moving object, but also a stationary object.

In the following description, the short distance motion sensor 120 and the long distance motion sensor 130 are collectively referred to as a complex sensor.

The illuminance sensor 110 functions to sense an illuminance around the lighting apparatus of the present invention. In the present invention, the lamp 170 is adapted to commence an operation when the illuminance around the lighting apparatus is lowered to a predetermined value or less. Therefore, the controller 150 may control the lamp 170 using the complex sensor by analyzing a sensing signal transmitted from the illuminance sensor 110 and judging that the illuminance around the lighting apparatus is lowered to the predetermined value.

The signal amplifier 140 functions to amplify sensing signals from the above-described sensors 120 and 130 and to transmit the same to the controller 150. While FIG. 3 shows that a plurality of signal amplifiers is independently provided on a per sensor basis, an integrated signal amplifier for all of the sensors may be provided.

The power unit 160 functions to supply power to the lamp 170 to enable operation of the lamp 170 under control of the controller 150.

The lamp 170 is operated by power supplied from the power unit 160 and is configured such that the brightness thereof is adjustable in multiple stages. The lamp 170 may include any one or plural ones of incandescent lamps, fluorescent lamps, halogen lamps, LED lamps, and other typical lamps, such that the brightness thereof is adjustable in response to a brightness control signal from the controller 150.

The timer 180 functions to count a dark adaptation time and a light adaptation time under control of the controller 150 in a state in which the lamp 170 has emitted light at a first brightness or a second brightness and to transmit a counting signal to the controller 150. Note that the dark adaptation time depends on illuminance and, therefore, is differently set according to illuminance.

The controller 150 functions to adjust the brightness of the lamp 170 by controlling the power unit 160 or the lamp 170. Upon controlling the brightness of the lamp 170, the controller 150 does not operate the lamp 170 when the illuminance around the lighting apparatus sensed by the illuminance sensor 110 is higher than the predetermined value. On the other hand, when the illuminance around the lighting apparatus is at or below the predetermined value, the controller 150 switches the lamp 170 to a standby mode to enable operation of the lamp 170.

In the standby mode, upon receiving no sensing signal from the short distance motion sensor 120 or the long distance motion sensor 130, the controller 150 may turn off the lamp 170, or may control the lamp 170 so that the lamp 170 emits light at a predetermined minimum brightness (hereinafter briefly referred to as "zeroth brightness").

In the standby mode, upon receiving a sensing signal from the long distance motion sensor 130, the controller 150 may control the lamp 170 so that the lamp 170 emits light at predetermined first brightness. In addition, in the standby mode or once the lamp 170 has operated to emit light at the first brightness, upon receiving a sensing signal from the short distance motion sensor 120, the controller 150 may control the lamp 170 so that the lamp 170 emits light at a predetermined second brightness that is higher than the first brightness. In addition, the controller 150, in which the dark adaptation threshold value is set, controls reduction in the brightness of the lamp 170 by an illuminance within the dark adaptation threshold value as the timer 180 counts a dark adaption time in a state in which the lamp 170 has emitted light at the first brightness or the second brightness, in order to achieve reduction in energy consumption while preventing a person from perceiving variation in illuminance. Upon receiving no sensing signal from the complex sensor, the controller 150 controls the lamp 170 so that the brightness of the lamp 170 is slowly lowered rather than being suddenly lowered, which may prevent a person from being inconvenienced due to sudden variation in illuminance.

With regard to reduction by the illuminance within the dark adaptation threshold value under the condition of the second brightness, in consideration of energy consumption based on the relationship between energy and illuminance as shown in FIG. 1 in which illuminance increases gently despite rapid increase in energy, the illuminance reduction is controlled to ensure that an illuminance difference between the second brightness and a lower brightness is within a range imperceptible to people.

Similarly, with regard to reduction by the illuminance within the dark adaptation threshold value under the condition of the first brightness, the illuminance reduction is controlled to ensure that an illuminance difference between the first brightness and a lower brightness is within a range imperceptible to people. However, considering the relationship between energy and illuminance of FIG. 1, this illuminance reduction is less effective than that in the second brightness.

Hereinafter, operation of the controller 150 as described above will be described in detail with reference to FIGS. 4 to 6.

Figure 4:
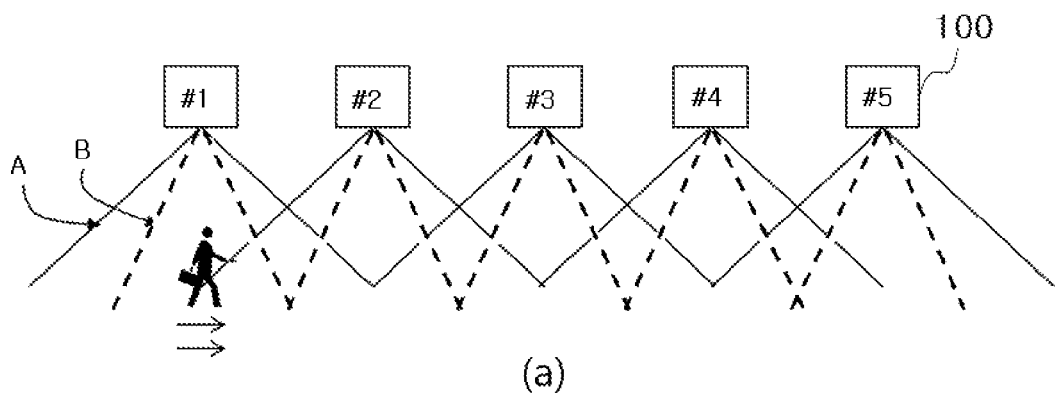
FIG. 4 is a view showing a state in which a person moves through a passage in which the lighting apparatus having the complex sensor according to the present invention is mounted.
Figure 4:
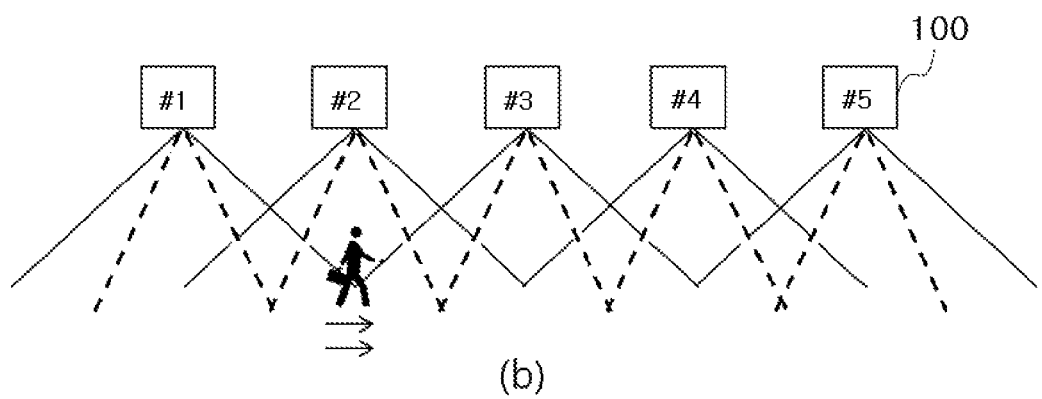
Figure 5:
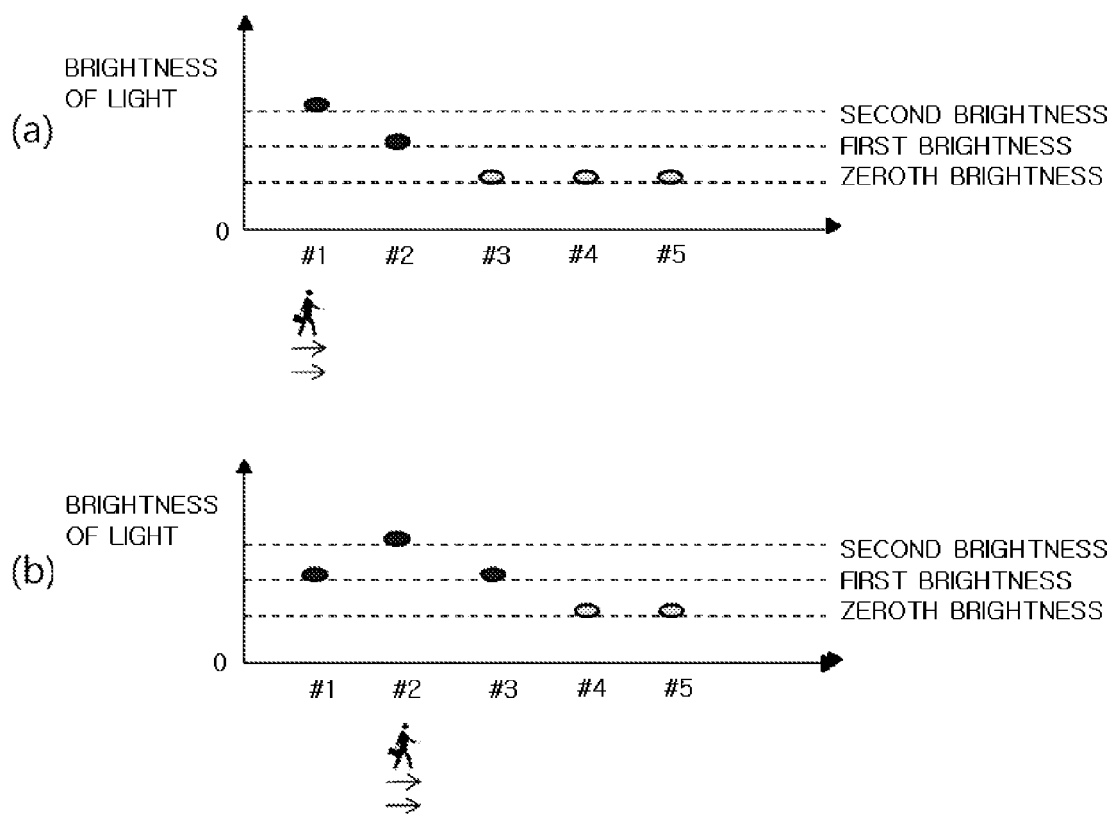
FIG. 5 is a view showing the relationship between a position of the user shown in FIG. 4 and the brightness of a lamp according to the present invention.
Figure 6:
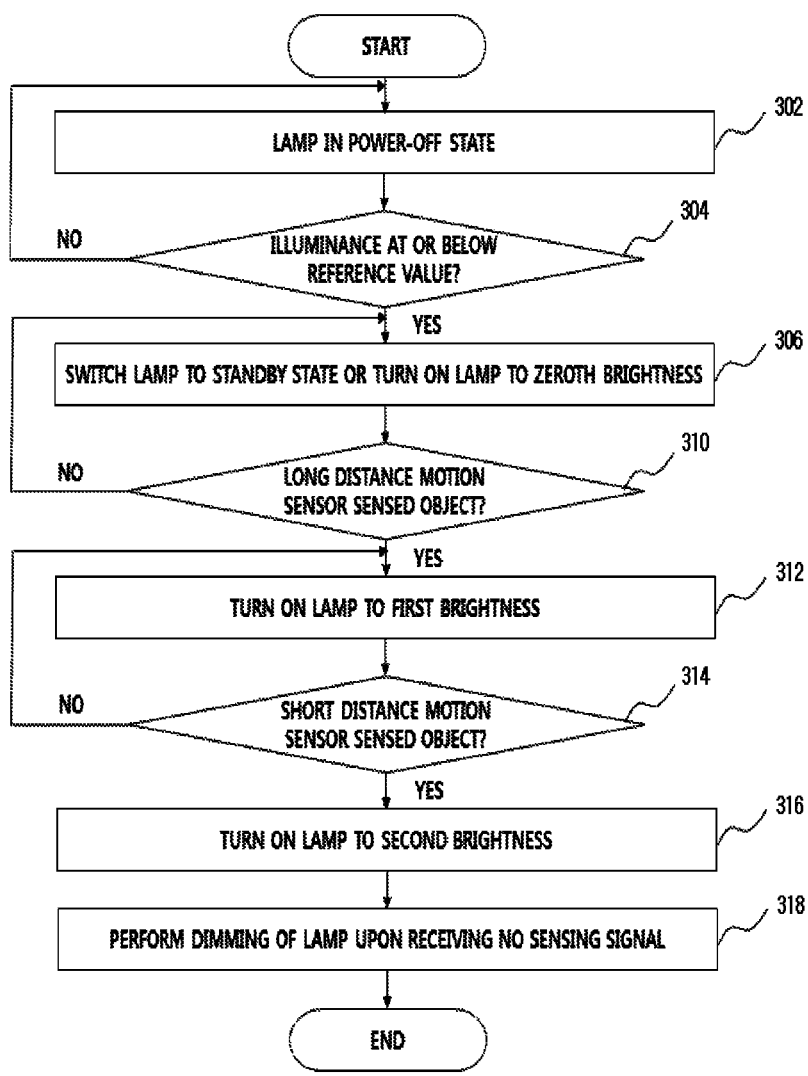
FIG. 6 is a flowchart showing one embodiment of a method for operating the lighting apparatus having the complex sensor according to the present invention.

FIG. 4 is a view showing a state in which a person moves through a passage in which the lighting apparatus 100 having the complex sensor according to the present invention is mounted, and FIG. 5 is a view showing the relationship between a position of the user shown in FIG. 4 and the brightness of the lamp according to the present invention. FIG. 6 is a flowchart showing one embodiment of a method for operating the lighting apparatus having the complex sensor according to the present invention. In the following description, as exemplarily shown in FIGS. 4 and 5, the present invention will be described based on the case in which five lighting apparatuses 100 each having the complex sensor according to the present invention are mounted in a long passage by way of example.

As described above, the present invention relates to the lighting apparatus 100 using the complex sensor 120 and 130.

More specifically, the lighting apparatus 100 incorporates the illuminance sensor 110 to distinguish between day and night, the long distance motion sensor 130 to sense an object located at a long distance, and the short distance motion sensor 120 to sense an object located at a short distance. The illuminance sensor 110 measures a current illuminance around the lighting apparatus 100 and, when the measured illuminance has a reference value or less, the controller 150 turns on the lamp 170 to emit light at a predetermined minimum brightness (zeroth brightness), or turns on the lamp 170.

First, in a power-off state of the lamp (302), the controller 150 judges, based on a sensing signal from the illuminance sensor 110, whether the illuminance around the lighting apparatus 100 of the present invention is at or below a reference value (304). That is, the lamp that outputs light in a dark place is dealt with in the present invention and the lamp does not need to be turned on in a bright state. Accordingly, in the present invention, the controller 150 judges the illuminance around the lighting apparatus 100 of the present invention in a power-off state of the lamp 170, thereby continuously judging whether the sensed illuminance is at or below a predetermined illuminance.

Here, the predetermined illuminance (reference value) may be set in various ways in consideration of, for example, the position and size of a passage and the passing amount of people. Information regarding the predetermined illuminance may be managed in the controller 150. That is, the controller 150 judges whether to turn on the lamp 170 by comparing the predetermined illuminance with the sensing signal transmitted from the illuminance sensor 110.

Next, when the judged result is that the illuminance around the lighting apparatus 100 is greater than the predetermined illuminance (reference value), the controller 150 keeps the lamp 170 in a power-off state. When the judged result is that the illuminance around the lighting apparatus 100 is at or below the predetermined illuminance, the controller 150 switches the lamp 170 to a lamp turn-on standby state, or turns on the lamp 170 to emit light at a zeroth brightness (306).

Here, the lamp turn-on standby state refers to a state in which the lamp 170 is in a power-off state, but can be turned on anytime in response to a person sensing signal from the long distance motion sensor 130 or the short distance motion sensor 120. That is, according to the present invention, even if the illuminance around the lighting apparatus 100 is at or below the predetermined illuminance, the controller 150 may keep the lamp 170 in a power-off state so long as it is not essential to turn on the lamp 170.

However, when the illuminance around the lighting apparatus 100 is at or below the predetermined illuminance and it is essential to turn on the lamp 170 in consideration of, for example, the position and size of a passage and the passing amount of people, according to the present invention, the controller 150 may turn on the lamp 170 to emit light at the zeroth brightness. Here, the zeroth brightness refers to the minimum brightness of the lamp 170. In the following description, the zeroth brightness refers to brightness lower than a first brightness and a second brightness.

The zeroth brightness may be set in various ways in consideration of, for example, the position and size of a passage and the passing amount of people. That is, when the vicinity of the lighting apparatus 100 becomes dark, the lamp 170 of the present invention may be turned on to emit light at the minimum brightness for somebody who will move through a passage even if the passing amount of people is not great.

Next, as exemplarily shown in (a) of FIG. 4, when an object is primarily sensed within a sensing range A of the long distance motion sensor 130 of a lighting apparatus #1 having a first complex sensor (310), the controller 150 of the lighting apparatus #1 having the first complex sensor turns on the lamp 170 to emit light at a predetermined brightness (first brightness) (312).

At this time, the short distance motion sensor 120 of the lighting apparatus #1 having the first complex sensor is not sensing the object (314).

In addition, the long distance motion sensor 130 of a lighting apparatus #2 having a second complex sensor is also not sensing the object (310). Thus, the controller 150 of the lighting apparatus #2 having the second complex sensor may turn on the lamp 170 to emit light at the zeroth brightness, or turn off the lamp 170 (306).

Next, when the person approaches closer to the lighting apparatus #1 having the first complex sensor and is sensed within a sensing range B of the short distance motion sensor 120 of the lighting apparatus #1 having the first complex sensor as exemplarily shown in (a) of FIG. 4 (314), the controller 150 of the lighting apparatus #1 having the first complex sensor turns on the lamp 170 to the predetermined highest brightness (second brightness) as exemplarily shown in (a) of FIG. 5 (316).

At this time, the long distance motion sensor 130 of the lighting apparatus #2 having the second complex sensor is sensing the object (310). Thus, the controller 150 of the lighting apparatus #2 having the second complex sensor may turn on the lamp 170 to emit light at the first brightness as exemplarily shown in (a) of FIG. 5.

Since no sensor of the other lighting apparatuses #2 to #5 senses the object, the controllers 150 of the other lighting apparatuses #2 to #5 having complex sensors may turn on the lamps 170 to the zeroth brightness as exemplarily shown in (a) of FIG. 5, or may turn off the lamps 170 (306).

Next, as exemplarily shown in (b) of FIG. 4, when the person moves to a position where the person is sensed by the long distance motion sensor 130 of the lighting apparatus #1 having the first complex sensor and the short distance motion sensor 120 of the lighting apparatus #2 having the second complex sensor, the controller 150 of the lighting apparatus #1 having the first complex sensor turns on the lamp 170 to emit light at the predetermined middle brightness (first brightness) as exemplarily shown in (b) of FIG. 5 (312).

At this time, the short distance motion sensor 120 of the lighting apparatus #2 having the second complex sensor is also sensing the object (314). Thus, the controller 150 of the lighting apparatus #2 having the second complex sensor turns on the lamp 170 to the highest brightness (second brightness) as exemplarily shown in (b) of FIG. 5 (316).

In addition, when the person is located at a position shown in (b) of FIG. 4, the long distance motion sensor 130 of the lighting apparatus #3 having a third complex sensor is sensing the object (310). Thus, the controller 150 of the lighting apparatus #3 having the third complex sensor turns on the lamp 170 to the first brightness that is the middle brightness as exemplarily shown in (b) of FIG. 5 (312).

Since no sensor of the other lighting apparatuses #4 and #5 senses the object, the controllers 150 of the other lighting apparatuses #4 and #5 having complex sensors may turn on the lamps 170 to emit light at the zeroth brightness as exemplarily shown in (b) of FIG. 5, or may turn off the lamps 170 (306).

Finally, when the person moves from the position shown in (b) of FIG. 4 to be closer to the lighting apparatus #3 having the third complex sensor, based on the above-described principle, the controller 150 of the lighting apparatus #2 having the second complex sensor controls the lamp 170 to emit light at the first brightness that is the middle brightness and the controller 150 of the lighting apparatus #3 having the third complex sensor controls the lamp 170 to emit light at the second brightness that is the highest brightness (316).

At this time, the short distance motion sensor 120 or the long distance motion sensor 130 of the lighting apparatus #1 having the first complex sensor no longer transmits a sensing signal. In this case, the controller 150 may control gradual reduction in the brightness of the lamp 170 from the first brightness until the lamp 170 emits light at the zeroth brightness, or until the lamp 170 is turned off. This means that the lamp 170 is switched to a standby state or a zeroth brightness state (306). That is, in the present invention, the lamp 170 may be turned on to emit light at the first brightness or the second brightness as a person approaches and, thereafter, may be returned to an original state thereof when the person moves out of a sensing range A or B. In this case, the lamp 170 is adapted to gradually reduce the brightness thereof, rather than being suddenly turned off or being suddenly switched to the zeroth brightness state.

This control (also referred to as dimming) as described above may be performed using various methods that are currently utilized. Thus, a detailed description thereof will be omitted herein.

The above-described procedure is equally applied to all lighting apparatuses having complex sensors.

Meanwhile, as the timer 180 is operated to count a dark adaptation time in a state in which the lamp 170 is turned on to emit light at the first brightness or the second brightness and the controller 150 controls reduction in brightness by the illuminance within the dark adaptation threshold value in response to a counting signal from the timer 180, reduction in energy consumption may be accomplished while preventing people from recognizing variation in illuminance. At this time, when reduction in brightness by the illuminance within the dark adaptation threshold value is performed whenever the timer 180 generates a counting signal, it is desirable that the first brightness is reduced to a brightness greater than the zeroth brightness by the illuminance within the dark adaptation threshold value and the second brightness is reduced to a brightness greater than the first brightness by the illuminance within the dark adaptation threshold value.

In addition, the timer 180 is controlled to count a light adaptation time to prevent people from feeling excessively rapid variation in illuminance upon variation from the first brightness to the second brightness. In addition to the dark adaptation threshold value, a light adaptation threshold value is set in the controller 150. In this way, variation from the first brightness to the second brightness may be performed based on the light adaptation threshold value.

In conclusion, characteristics of the present invention as described above are as follows.

First, the present invention is capable of more accurately sensing an object using a complex sensor that consists of a short distance motion sensor and a long distance motion sensor and of keeping a lamp in a power-on state even if there is no motion of the object. In this way, the present invention enables interworking operation of lighting apparatuses without using a wired/wireless communication device to relieve anxiety that people may feel when passing through a dark passage.

Second, when an object approaches the vicinity of a lighting apparatus having a complex sensor according to the present invention, the present invention causes a lamp of the lighting apparatus to primarily emit light at a predetermined brightness (first brightness) in response to a sensing signal from a long distance motion sensor and to secondarily emit light at a predetermined highest brightness (second brightness) in response to a sensing signal from a short distance motion sensor. In this way, when a person who is located at a long distance moves to a passage, the present invention is capable of previously turning on the lamp to reduce danger of accidents and to relieve anxiety that people may feel when passing through a dark passage.

Third, the present invention is capable of reducing energy consumption while preventing people from recognizing variation in illuminance by gradually reducing the brightness of a lamp by illuminance within a dark adaptation threshold value in a state in which the lighting apparatus emits light at a first brightness or a second brightness.

Fourth, the present invention is capable of reducing energy consumption by performing dimming of a lamp to a predetermined minimum illuminance (zeroth brightness) when no sensing signal is transmitted from the complex sensor. In addition, when the lamp is switched from a power-off state such as a standby state or a zeroth brightness state to a first brightness state under control, when the lamp is switched from the first brightness state to a second brightness state under control, and when the lamp is switched from the second brightness state to the first brightness state under control, the present invention is capable of gradually reducing or increasing the brightness of the lamp by applying the above-described dimming. In addition, when no sensing signal is transmitted from the complex sensor, the brightness of the lamp may be reduced to a minimum illuminance (zeroth brightness) by an illuminance within a dark adaption threshold value through the above-described dimming.

Fifth, when a person approaches the vicinity of the lighting apparatus of the present invention, the lamp primarily emits light at a predetermined brightness (first brightness) via sensing of the long distance motion sensor and secondarily emits light at a predetermined highest brightness (second brightness) via sensing of the short distance motion sensor. Thereby, in the case in which a plurality of lighting apparatuses is mounted in a passage, it can be anticipated that the lighting apparatuses operate like an interworking system even without a specific interworking device. This effect may be accomplished in a lighting system in which a plurality of lighting apparatuses each having a complex sensor according to the present invention is mounted.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the embodiments as described above are merely to be understood by way of example in all aspects and are not intended to limit the scope of the present invention. The scope of the present invention should be defined by the following claims, rather than being defined by the above detailed description, and all modifications or alterations derived from the meaning and scope of the claims and equivalents thereof should be construed as belonging to the scope of the present invention.

What is claimed is:

1. A lighting system including a plurality of lighting apparatuses having complex sensors, each lighting apparatus having the complex sensor comprising:
    a short distance motion sensor configured to sense an object located at a short distance;
    a long distance motion sensor configured to sense an object located at a long distance;

a signal amplifier configured to amplify sensing signals received from the short distance motion sensor and the long distance motion sensor;
a lamp configured to be adjustable in brightness in multiple preset stages;
a timer configured to count a dark adaptation time; and
a controller storing a preset dark adaptation threshold value,
wherein the controller controls the lamp to a first brightness upon receiving a sensing signal from the long distance motion sensor, controls the lamp to a second brightness greater than the first brightness upon receiving a sensing signal from the short distance motion sensor, and controls the timer to count the dark adaptation time at the second brightness, thereby controlling the lamp to be reduced in brightness by an illuminance within the preset dark adaptation threshold value whenever the timer generates a counting signal, and
wherein, while the short distance motion sensor included in a corresponding one of the lighting apparatuses having the complex sensors senses an object to cause the lamp to emit light at the second brightness, the long distance motion sensor included in another lighting apparatus having the complex sensor in proximity to the corresponding lighting apparatus senses the object to cause the lamp to emit light at the first brightness.

2. The lighting system according to claim 1, wherein the controller controls the lamp to the first brightness upon receiving a sensing signal from the long distance motion sensor and controls the timer to count the dark adaptation time at the first brightness, thereby reducing the brightness of the lamp by the illuminance within the preset dark adaptation threshold value whenever the timer generates a counting signal.

3. The lighting system according to claim 1, wherein, upon controlling the brightness of the lamp, the controller controls the timer to recount the dark adaptation time upon receiving no object sensing signal from the long distance motion sensor and the short distance motion sensor, thereby controlling the lamp to a zeroth brightness or to be turned off by continuously reducing the brightness of the lamp by the illuminance within the preset dark adaptation threshold value whenever the timer generates a counting signal.

4. The lighting system according to claim 1, wherein the timer stores a preset light adaptation time and the controller further stores a preset light adaptation threshold value, and
wherein the controller controls the timer to count a light adaptation time upon receiving an object sensing signal from the short distance motion sensor, thereby controlling the lamp to the second brightness by increasing the brightness of the lamp by an illuminance within the preset light adaptation threshold value whenever the timer generates a counting signal.

5. The lighting system according to claim 1, wherein the timer stores a preset light adaptation time and the controller further stores a preset light adaptation threshold value, and
wherein the controller controls the timer to count a light adaptation time upon receiving an object sensing signal from the long distance motion sensor, thereby controlling the lamp to the first brightness by increasing the brightness of the lamp by an illuminance within the preset light adaptation threshold value whenever the timer generates a counting signal.

* * * * *